United States Patent [19]
Roberts

[11] Patent Number: 5,129,099
[45] Date of Patent: * Jul. 7, 1992

[54] RECIPROCAL HYBRID MODE RF CIRCUIT FOR COUPLING RF TRANSCEIVER TO AN RF RADIATOR

[75] Inventor: Roger G. Roberts, Auburn, Ga.

[73] Assignee: Electromagnetic Sciences, Inc., Norcross, Ga.

[ * ] Notice: The portion of the term of this patent subsequent to Dec. 24, 2008 has been disclaimed.

[21] Appl. No.: 330,638

[22] Filed: Mar. 30, 1989

[51] Int. Cl.⁵ .......................... H04B 1/48; H01P 1/32
[52] U.S. Cl. ....................... 455/81; 333/1.1; 455/82; 455/278.1; 455/281
[58] Field of Search ............. 455/80, 81, 271, 277, 455/280–282, 327, 328, 82, 83, 276, 278; 333/1.1, 24.1, 24.2, 26

[56] References Cited

U.S. PATENT DOCUMENTS

| | | |
|---|---|---|
| 2,894,216 | 7/1959 | Crowe . |
| 3,408,597 | 10/1968 | Heiter ................... 333/24.1 |
| 3,425,003 | 1/1969 | Mohr ...................... 333/31 |
| 3,471,809 | 10/1969 | Parks et al. ............. 333/31 |
| 3,524,152 | 8/1970 | Agrios et al. ........... 333/24.1 |
| 3,539,950 | 11/1970 | Freibergs ................ 333/24.1 |
| 3,585,536 | 6/1971 | Braginski et al. ....... 333/31 |
| 3,599,121 | 8/1971 | Buck ........................ 333/31 R |
| 3,656,179 | 4/1972 | DeLoach ................. 333/31 |
| 3,758,886 | 9/1973 | Landry et al. .......... 333/97 R |
| 3,849,746 | 11/1974 | Mason et al. ........... 333/24.1 |
| 3,952,267 | 4/1976 | Dischert ................. 333/24.1 |
| 3,986,149 | 10/1976 | Harris et al. ........... 333/31 R |
| 4,001,733 | 1/1977 | Birch et al. ............ 333/24.1 |
| 4,349,790 | 9/1982 | Landry ................... 333/24.1 |
| 4,434,409 | 2/1984 | Green ..................... 333/24.1 |
| 4,445,098 | 4/1984 | Sharon et al. .......... 333/1.1 |
| 4,641,365 | 2/1987 | Montini, Jr. ........... 455/78 |
| 4,682,126 | 7/1987 | Milberger et al. ...... 333/81 B |
| 4,745,377 | 5/1988 | Stern et al. ............. 333/26 |
| 4,806,886 | 2/1989 | Stern et al. ............. 333/24.2 |
| 4,816,787 | 3/1983 | Stern et al. ............. 333/158 |
| 4,884,045 | 11/1989 | Alverson et al. ....... 333/158 |
| 4,904,965 | 2/1990 | Blight et al. ........... 333/1.1 |

Primary Examiner—Reinhard J. Eisenzopf
Assistant Examiner—Chi H. Pham
Attorney, Agent, or Firm—Nixon & Vanderhye

[57] ABSTRACT

A reciprocal transceiver to radiator coupling circuit uses both microstrip and waveguide modes of RF signal transmission (including a pair of nonreciprocal hybrid mode phase shifters) to gain size and weight advantages useful in feeding large scale phase arrays. At the same time, the radar cross section of such array apertures is reduced by arranging separate nonreciprocal receive and transmit branches of the circuit to route spurious intra-circuit reflections of incoming RF signals to a matched termination.

18 Claims, 2 Drawing Sheets

5,129,099

RECIPROCAL HYBRID MODE RF CIRCUIT FOR COUPLING RF TRANSCEIVER TO AN RF RADIATOR

FIELD OF INVENTION

This invention is generally directed to microwave RF circuits for coupling an RF transceiver to an RF radiator while simultaneously minimizing the radiator reluctance with respect to incident RADAR signals. Thus, this invention will have special utility in conjunction with RF devices mounted in aircraft that are desired to have minimum overall aircraft RADAR cross-section (RCS).

RELATED APPLICATIONS

This application is related to the following commonly assigned copending applications:
Roberts et al., 07/330,617 filed Mar. 30, 1989 for HYBRID MODE RF PHASE SHIFTER
Wallis et al., 07/333,961 filed Apr. 6, 1989 for SIMPLIFIED DRIVER FOR CONTROLLED FLUX FERRITE PHASE SHIFTER
Rigg, 07/353,431 filed May 18, 1989 for DISTRIBUTED PLANAR ARRAY BEAM STEERING CONTROL

BACKGROUND OF THE INVENTION

When attempting to minimize the overall radar cross section (RCS) of an aircraft, RF radiators provide a special problem. They must, of course, be "exposed" in an RF sense else they cannot perform as desired to transmit and/or receive RF signals. However, such exposed radiators also can provide fairly efficient reflection of incident radar signals unless special precautions are taken. This problem is especially acute when large scale arrays of RF radiators are employed.

Industry has given considerable attention to low RCS (radar cross-section) antennas. The objective is to have the reflection coefficient at the input to a radiation aperture to be not only minimized but also uniform from element to element within the array. With previously available reciprocal phase shifters, this requirement has been very difficult because the reflection coefficient at each end of a phase shifter is separated by many wavelengths of reciprocal phase shift resulting in a reflection coefficient which varies significantly with phase state (i.e. the magnitude of phase shift programmed into a particular phase shifter).

BRIEF SUMMARY OF THE INVENTION

A miniaturized hybrid mode RF phase shifter has now been discovered as described and claimed in the above-referenced related copending application of Roberts et al (the entire content of which is hereby incorporated by reference). In brief summary, an essentially "planar" microstrip phase shifter is realized by efficiently transitioning from a microstrip transmission line mode to a (serially connected) miniature waveguide ferrite phase shifter mode—and back again, if desired, to the microstrip mode after the phase shifter. (A detailed understanding of the phase shifter per se may be had from U.S. Pat. No. 4,445,098 to Sharon et al. which is hereby also incorporated by reference.)

We have now discovered novel microwave circuits which use three ferrite microstrip RF circulators (or two circulators and a diode switch) in conjunction with two of the new non-reciprocal Roberts et al hybrid mode RF phase shifters to provide a fully reciprocal transceiver/radiator RF coupling circuit which is small enough to be usable to reduce the effective RCS of an array of closely spaced radiators at microwave frequencies. A significant feature of this device is its high performance and small size. The unit is small enough to be placed on 0.6 wavelength centers for phased array applications.

A unit was assembled and tested at X band. The insertion loss was less than 1.3 dB over a 15% bandwidth. The phase accuracy was measured and found to be comparable to the Sharon et al device, which is the most accurate phase shifter known to date.

In addition to lowered RCS, these novel circuits also provide a fully reciprocal hybrid mode RF phase shifter device which may be employed for the reciprocal feature alone (even where low RCS is not important).

Most phased arrays are used for both transmit and receive operations. Therefore, reciprocal operation, in most cases, is desired. Although the Roberts et al hybrid mode F phase shifter is a non-reciprocal type of phase shifter, it can be switched between transmit and receive modes for reciprocal operations. (See the Sharon et al patent as noted above for the details of required flux switching operations.)

However, the Roberts et al hybrid mode RF phase shifter can also be used in conjunction with microstrip circulators for nonswitched reciprocal operation. For example, three microstrip circulators and two hybrid mode RF phase shifters can be assembled in circuit to provide such a nonswitched receiprocal device. To minimize cost, a ferrite substrate is used so that the required circulators are formed in microstrip (e.g., by etching the required pattern on a metallized ferrite substrate). The necessary circulator magnets in this case are attached under the substrate (Samarium Cobalt) and/or on top of the substrate (ALNICO) with epoxy. The ground plane has formed recessions to house the hybrid mode phase shifters and circulator magnets.

One hybrid mode RF phase shifter is used for transmit operations and the other is used for receive operations. The microstrip circulators direct the RF through dedicated transmit and receive paths. An electronics driven assembly necessary to switch the phase shifter as desired for phased array operations also may be mounted on the substrate.

This reciprocal circuit arrangement of hybrid mode phase shifters provides low loss nonreciprocal phase shifting devices and as mentioned above small enough to fit into a package which allows 0.6 wavelength (0.7 inch at 10 GHz) element spacing at X-band.

For example, the complete reciprocal circuit may have a cross section of only 0.411 inch×0.60 inch. Therefore, the 0.6 wavelength spacing requirement does not present an insurmountable problem.

With the reciprocal hybrid mode RF circuit of this invention, a signal entering from the aperture side will be reflected from one of the phase shifters and will go into a terminated port on one of the circulators thus reducing the change in reflection coefficient as a function of phase state. This condition is true when the feed reflection coefficient is neglected. If, on the other hand, the feed and aperture have large reflection coefficients, then the input reflection coefficient changes drastically with phase setting, therefore, the uniform reflection coefficient would not be achieved. A second exemplary embodiment handles this situation.

A way to isolate the aperture from the feed in terms of reflection coefficient in non-operating condition is to design a second circulator so that it can be switched. In the operating mode the switched circulator is latched to one direction; this is the operating condition. This allows for reciprocal operation of the element. If it is desired that the antenna have low RCS or uniform reflection coefficient between elements, then the second circulator is switched to circulate in the opposite direction and any signal coming from a hostile radar would be routed to the terminated port of a third circulator. This means that, to first order effects, the reflection coefficient would only be that of the matched-terminated second circulator.

Uniform reflection coefficients of circulators etched on a ferrite substrate are achievable using known techniques. Using the switched circulator technique, the antenna can be switched to a stow position for low RCS or uniform reflection coefficients from element to element. The switched (second) circulator, switched to its second direction of circulation, isolates the feed from the aperture.

Another means of isolating the feed from the aperture uses a diode switch to switch between transmit and receive stages.

The signal during transmit mode goes into a first phase shifter and out through a first circulator to the aperture. Any signal from the hostile radar, during the transmit mode, will appear at the aperture and pass through the first and second circulators and a second hybrid mode phase shifter. Any reflection seen at the diode switch, off-port will be reflected to the terminating port on the second circulator. Therefore, when the diode switch is in the transmit condition, most of the receive signals will be terminated at the off port of the diode switch and the load on the second circulator.

When the diode switch is switched to the receive position, any signal received at the aperture will pass through the first and second circulators, and second phase shifter and the switch. Any reflection from the second phase shifter or the feed will be terminated in the second circulator. For this configuration, the aperture and feed are isolated in terms of interfering reflection coefficients under all conditions. The diode switch must be switched between transmit and receive. However, this can be accomplished in nanoseconds, and therefore will not have much impact on system operation.

BRIEF DESCRIPTION OF THE DRAWINGS

A more complete understanding of these and other objects of this invention may be had by study of the following detailed description of exemplary embodiments taken in conjunction with the accompanying drawings, of which.

DETAILED DESCRIPTION OF EXEMPLARY EMBODIMENTS

Figure 1:
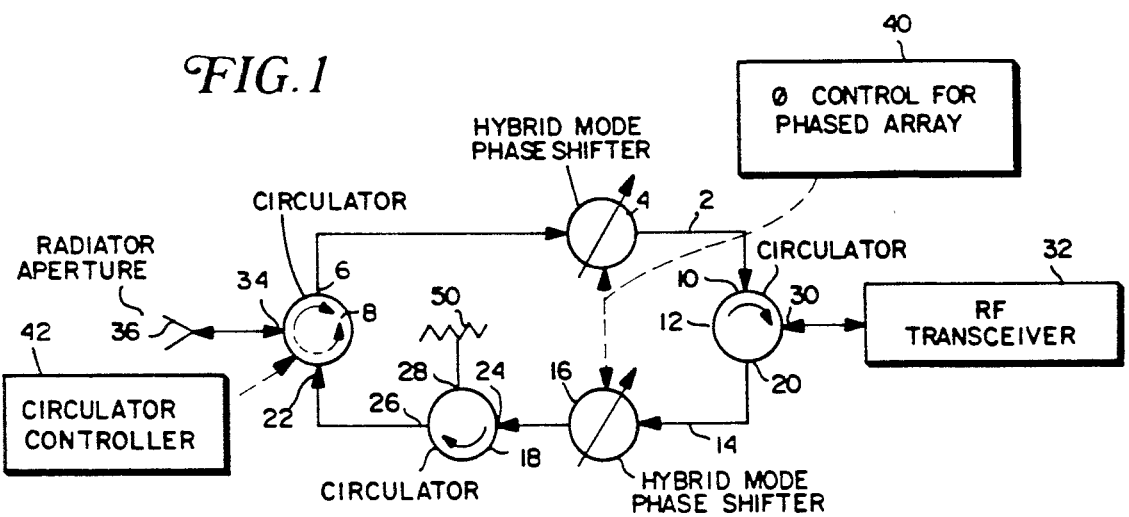
FIG. 1 is a schematic circuit diagram of a first embodiment in which unwanted signals are absorbed in a dedicated transmission path.

In the exemplary embodiment of FIG. 1, a receive signal path 2 contains a Roberts et al type hybrid mode RF phase shifter 4 connected between port 6 of circulator 8 and port 10 of circulator 12. Transmit signal path 14 contains another Roberts et al type hybrid mode RF phase shifter 16 connected in series with ports 24 and 26 of circulator 18, port 20 of circulator 12 and port 22 of circulator 8. Port 28 of circulator 18 is connected to an impedance 50 that is matched to the characteristic impedance of the microstrip conductor and circulator port 28. Port 30 of circulator 12 is coupled to the input/output terminal of transceiver 32 and port 34 of circulator 8 is coupled to a radiating element 36 (e.g., one of many in a phased array).

As is well-known, a circulator has three ports. An RF signal applied to one port is coupled substantially only to the next port in the direction of rotation for the circulator (that is indicated by an arrow as determined by the direction of an applied magnetic field perpendicular to the circulator plane). Thus, for example, a signal applied to port 10 of circulator 12 passes to port 30 and then to transceiver 32. A signal to be transmitted is applied to port 30 and passes to port 20. In the text that follows, a circulator port will be said to precede the port, next encountered in the direction of circulation (and to succeed the port next encountered in the opposite direction). Thus, port 10 of circulator 12 precedes port 30 and succeeds port 20.

Setting of the phase shifters 4 and 16 to desired phase states for phased array operation is achieved in any desired suitable manner by circuit 40 (e.g., see the above-cited related Sharon et al patent or Wallis et al patent application). The direction of rotation for circulator 8 can also be conventionally controlled by a suitable circuit 42. The latter merely changes the direction of a current pulse, which latches the circulator in one direction of circulation or the other, for example, so as to change the direction of magnetic field and hence the direction of rotation as indicated by a solid arrow circulator mode and by an alternative dashed arrow mode in FIG. 1.

When transceiver 32 transmits RF pulses (and then typically waits for reflections thereof), the circuit of FIG. 1 operates as follows. The RF signal pulses to be transmitted are applied to port 30 and are coupled via the succeeding port 20 to phase shifter 16 and from there via the circulators 18 and 8 to port 34 and the radiator 36.

Any signals impinging on the radiator element 36 (whether they be from an unfriendly source or reflections of the transmitted pulses) are directed to the succeeding port 6 of circulator 8 and to the input of the phase shifter 4. A small portion of signals reflected from the input of phase shifter 4 do not reach the radiation element 36 (as they typically would in the prior art) because they pass from port 6 of circulator 8 to its port 22 and then to port 26 or circulator 18 so as to reach the succeeding port 28 and terminating impedance 50. As previously explained, there is very little reflection from the impedance 50 because it is matched to the characteristic impedance of port 28 (and/or any interconnecting microstrip transmission line).

The larger percentage of any incident signal (whether it be from an unfriendly source or reflection of the transmitted signal) passes through phase shifter 4 to port 10 of circulator 12 and thence to transceiver 32. Any reflections from within the receive side of the circuit eventually reach the matched terminating impedance 50 (rather than passing to the radiation element 36).

Under any of the above conditions to a first order effect the reflection coefficient would only be that of the circulator 8 itself. Since such circulator can be accurately formed by an etched microstrip pattern on a ferrite surface, the same reflection coefficient can be accurately reproduced for each radiator element 36 and the overall array would look like a continuous surface.

Isolation between the radiating element 36 and even the interface with transceiver 32 (i.e., on the transmit circuit 14 sided during inactive standby conditions) can be obtained by switching the direction of the circulator 8 to the counter clockwise direction (shown in dotted line) with the circulator controller circuit 42 so that incident signals impinging on the radiating element 36 pass immediately to the now succeeding port 22 of circulator 8 and via ports 26 and 28 of circulator 18 to the terminating impedance 50.

Figure 2:
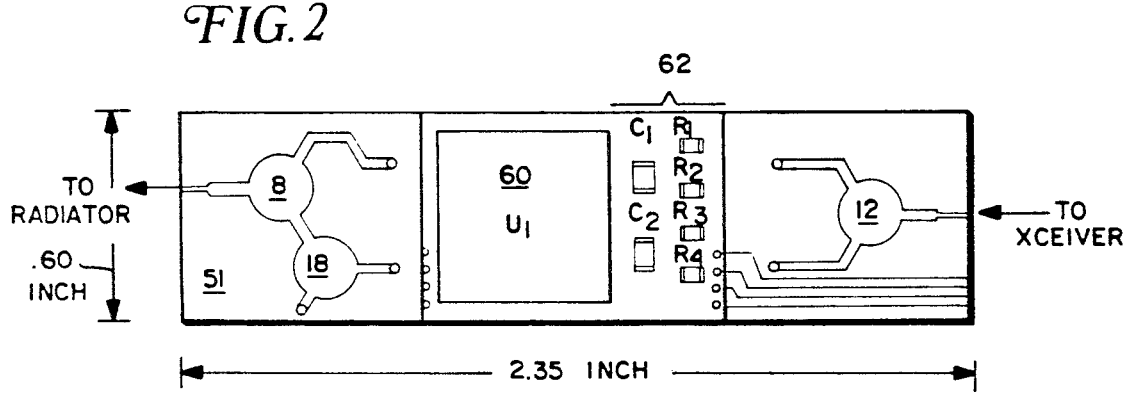
FIG. 2 is a top view of an exemplary physical embodiment of the FIG. 1 circuit.
Figure 3:
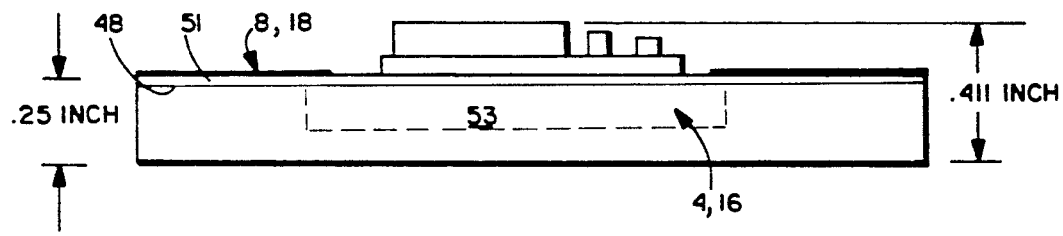
FIG. 3 is a side view of FIG. 2.
Figure 4:
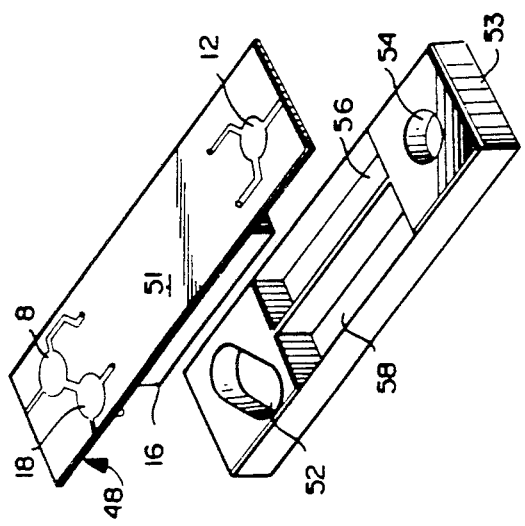
FIG. 4 is an exploded view of a portion of the physical embodiment of FIGS. 2-3 so as to better illustrate some of the physical components.

FIGS. 2, 3 and 4 illustrate how a circuit of the FIG. 1 embodiment may be physically constructed. In these drawings 48 designates a metallized ground plane and 51 designates a ferrite substrate. A lower metal housing 53 has a pocket 52 for retaining magnets for circulators 8 and 18, a pocket 54 for retaining a magnet for the circulator 12, and pockets 56 and 58 for retaining the hybrid mode RF phase shifters 4 and 6 of the aforesaid Roberts et al. type in which loaded phase shifter toroids and a dielectric center slab in a waveguide are matched at both ends to a microstrip transmission line thereby making it possible to directly connect them to the microstrip lines from the microstrip circulator ports. Local drive circuitry for the phase shifters 4, 16 may be located at 60 and 62. Possible actual dimensions are shown in FIGS. 2 and 3 showing that the entire device may be made easily to fit between radiation elements of a 10 GHz phased array.

Figure 5:
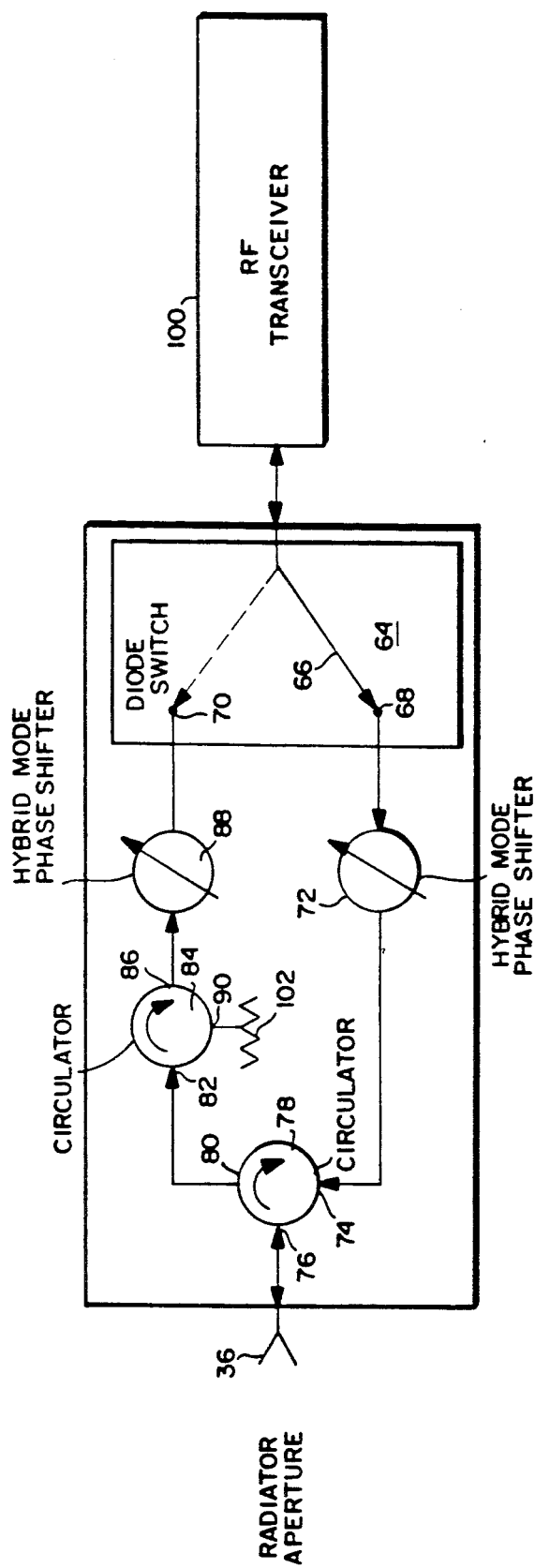
FIG. 5 is a schematic circuit diagram of another embodiment of the invention in which a diode switch is used rather than a third circulator and in which unwanted signals are absorbed in a dedicated reception path.

Reference is now made to the FIG. 5 for description of another exemplary embodiment of the invention. In this circuit diode switch 64 effectively has an arm 66 for connecting the input/output of transceiver 100 with either of two ports 68 or 70. In a transmit operating mode, switch arm 66 is "positioned" (via diode bias currents) as shown by a solid line so that transmitted RF pulses pass through phase shifter 72, and ports 74 and 76 of circulator 78 to radiating element 36. Any incident signals impinging on radiating element 36 during that time pass via port 80 to port 82 of circulator 84 and thence via port 86 to hybrid mode phase shifter 88. Any signals passing through the phase shifter 88 reach the terminated contact 70 of switch 64. These reflections (and any from the input of phase shifter 88) pass through port 86 and port 90 of circulator 84 to matched terminating impedance 102.

The switch arm 66 stays in the solid line position only long enough to permit the transmitted pulse to reach the radiation element 36 and at this time it is "moved" (via changed diode bias currents) to the dashed line portion so as to connect contact 70 to transceiver 100. Since diode switch 64 can be operated very quickly, it would connect the transceiver 100 to contact 68 only for as long as required to transmit. Reflections of pulses incident on the radiation element 36 flow via ports 80, 82 and 86 phase shifter 88, contact 70 and switch 64 to the transceiver. Any reflections in this receive circuit occurring after port 86 pass back via that port and port 90 of circulator 84 to matched terminating impedance 102 and thus are significantly reduced before reaching the radiating element 36. Thus, an antenna array of elements having circuits as described also exhibits a uniform reflection coefficient, and therefore the antenna would look like a continuous surface and not scatter a reflected signal.

Although only a few exemplary embodiments of this invention have been described in detail above, those skilled in this art will appreciate that many variations and modifications may be made in these examples while yet retaining many of the novel features and advantages of this invention. Therefore, all such modifications and variations are intended to be included within the scope of the appended claims.

What is claimed is:

1. A reciprocal hybrid mode RF coupling circuit for coupling an RF transceiver to an RF radiator element, said circuit comprising:
   a ferrite dielectric substrate;
   a microstrip RF transmit circuit having first and second ends and being located on said substrate and having a first nonreciprocal waveguide phase shifter connected serially therein;
   a microstrip RF receive circuit having first and second ends and also being located on said substrate and having a second nonreciprocal waveguide phase shifter connected serially therein;
   a first microstrip circulator located on said substrate and having three ports integrally formed and connected, respectively, with a first input/output microstrip line adapted for coupling to said radiator element to a first end of said receive circuit and to a first end of said transmit circuit;
   a second microstrip circulator located on said substrate and having two ports connected serially in one of said transmit and receive circuits and a third port connected to a matched non-reflecting termination impedance; and
   RF signal routing means connecting the second ends of said transmit and receive circuits to a second input/output microstrip line adapted for coupling to said transceiver.

2. A reciprocal hybrid mode RF coupling circuit as in claim 1 wherein:
   said second microstrip circulator is connected in said transmit circuit between said first microstrip circulator and said first nonreciprocal waveguide phase shifter.

3. A reciprocal hybrid mode RF coupling circuit as in claim 2 wherein:
   said RF signal routing means includes a third microstrip circulator having three ports, two of which are respectively connected to said second ends of the transmit and receive circuits and the third being integrally formed and connected to said second input/output microstrip line.

4. A reciprocal hybrid mode RF coupling circuit as in claim 3 further comprising:
   means for controllably changing the magnitude of RF phase shifts introduced by said first and second phase shifters.

5. A reciprocal hybrid mode RF coupling circuit as in claims 1 or 4 further comprising:

control means for selectively changing the direction of RF signal circulation in said first circulator.

6. A reciprocal hybrid mode RF coupling circuit as in claim 1 wherein:
said second microstrip circulator is connected in said receive circuit between said first microstrip circulator and said second nonreciprocal waveguide phase shifter.

7. A reciprocal hybrid mode RF coupling circuit for coupling an RF transceiver to an RF radiator element, said circuit comprising:
a ferrite dielectric substrate;
a microstrip RF transmit circuit having first and second ends and being located on said substrate and having a first nonreciprocal waveguide phase shifter connected serially therein;
a microstrip RF receive circuit having first and second ends and also being located on said substrate and having a second nonreciprocal waveguide phase shifter connected serially therein;
a first microstrip circulator located on said substrate and having three ports integrally formed and connected, respectively, with a first input/output microstrip line adapted for coupling to said radiator element to a first end of said receive circuit and to a first end of said transmit circuit;
a second microstrip circulator located on said substrate and having two ports connected serially in one of said transmit and receive circuits and a third port connected to a matched non-reflecting termination impedance, said second microstrip circulator is connected in said receive circuit between said first microstrip circulator and said second nonreciprocal waveguide phase shifter; and
RF signal routing means connecting the second ends of said transmit and receive circuits to a second input/output microstrip line adapted for coupling to said transceiver, said RF signal routing means includes a diode-switched microstrip circuit connected to selectively connect said second input/output microstrip line to the second end of said receive circuit or, alternatively, to the second end of said transmit circuit.

8. A reciprocal hybrid mode RF coupling circuit for coupling an RF transceiver to an RF radiator element, said circuit comprising:
a ferrite dielectric substrate including a metallized ground plane on the surface opposite said microstrip circuits and said waveguide phase shifters are conductively and mechanically affixed to and suspended from said ground plane;
a microstrip RF transmit circuit having first and second ends and being located on said substrate and having a first suspended nonreciprocal waveguide phase shifter connected serially therein;
a microstrip RF receive circuit having first and second ends and also being located on said substrate and having a second suspended nonreciprocal waveguide phase shifter connected serially therein;
said suspended waveguide phase shifters and magnetic field producing means associated with each of said microstrip circulators are housed within depressions formed in a conductive housing also electrically and mechanically affixed to said ground plane side of the substrate;
a first microstrip circulator located on said substrate and having three ports integrally formed and connected, respectively, with a first input/output microstrip line adapted for coupling to said radiator element to a first end of said receive circuit and to a first end of said transmit circuit;
a second microstrip circulator located on said substrate and having two ports connected serially in one of said transmit and receive circuits and a third port connected to a matched non-reflecting termination impedance; and
RF signal routing means connecting the second ends of said transmit and receive circuits to a second input/output microstrip line adapted for coupling to said transceiver.

9. A reciprocal hybrid mode RF coupling circuit as in claims 7 or 8 further comprising:
drive circuit means for electrically driving said phase shifters also supported by and disposed upon said ferrite substrate.

10. A circuit for coupling microwave signals between a transceiver and a radiating element, said circuit comprising:
a first terminal for connection to a transceiver,
a second terminal for connection to a radiator element,
a first circulator having three ports, a first of which is connected to said second terminal,
a first hybrid mode waveguide/microstrip latching phase shifter,
said first phase shifter being coupled between another port of said first circulator and said first terminal so that signals may flow in a first direction between said transceiver and second terminal,
a second circulator having three ports, one of which is connected to ground via a non-reflective terminating impedance,
a second hybrid mode waveguide/microstrip latching phase shifter, and
means for coupling said second circulator and said second phase shifter in series between a third port of said first circulator and said first terminal so that signals flow in a second opposite direction between said transceiver and said second terminal via said second circulator and said second phase shifter.

11. A circuit as set forth in claim 10 wherein:
said first direction is such that signals flow from said second terminal to said transceiver, and
said second direction being opposite such that signals flow from said transceiver to said second terminal.

12. A circuit for coupling microwave signals between a transceiver and a radiating element, said circuit comprising:
a first terminal for connection to a transceiver,
a second terminal for connection to a radiator element,
a first circulator having three ports, a first of which is connected to said second terminal,
a first hybrid mode waveguide/microstrip phase shifter,
said first phase shifter being coupled between another port of said first circulator and said first terminal so that signals may flow in a first direction between said transceiver and second terminal, said first direction is such that signals flow from said second terminal to said transceiver,
a second circulator having three ports, one of which is connected to ground via a non-reflective terminating impedance,
a second hybrid mode waveguide/microstrip phase shifter, and means for coupling said second circulator and said second phase shifter in series between a third port of said first circulator and said first terminal so that signals flow in a second opposite direction between said transceiver and said second terminal via said second circulator and said second phase shifter, said second direction being opposite such that signals flow from said transceiver to said second terminal, and for selectively connecting either the circuit including said first phase shifter or the circuit including said second phase shifter to the transceiver.

13. A circuit for coupling microwaves between a transceiver and a radiating element comprising:

a first terminal for connection to a transceiver, a second terminal for connection to a radiator element, a first circulator having three ports, a first port thereof being connected to said first terminal, a second circulator having three ports, a first port thereof being connected to said second terminal, a first hybrid mode waveguide/microstrip latching phase shifter coupled between a port of said first circulator that precedes its first port and a port of said second circulator that succeeds its first port, a third circulator having three ports, a first port of which is coupled to a non-reflective impedance, a connection between the port of said third circulator that precedes its first port and a port of said second circulator that precedes its first port, a second hybrid mode waveguide/microstrip latching phase shifter connected between the port of said third circulator that succeeds its first port and the port of said first circulator that succeeds its first port.

14. A circuit for coupling microwaves between a transceiver and a radiating element comprising:

a first terminal for connection to a transceiver, a second terminal for connection to a radiator element, a switch for connecting said first terminal to a first contact or to a second contact, thereof, a first circulator having three ports, a first of which is connected to said second terminal, a first hybrid mode waveguide/microstrip latching phase shifter connected between a port on said first circulator that precedes its first port and said first contact of said switch;

a second circulator having three ports, a first of which is connected to a non-reflecting terminating impedance;

a connection between the port of said second circulator that succeeds its first port and a port of said first circulator that succeeds its first port, and a second hybrid mode waveguide/microstrip latching phase shifter connected between the port of said second circulator that precedes its first port and said second contact of said switch.

15. A circuit for coupling microwaves between a transceiver and a radiating element comprising:

a first terminal for connection to a transceiver, a second terminal for connection to a radiator element, conduction path control means having three ports a first one of which is connected to said first terminal, a first circulator having three ports one of which is connected to said second terminal, a first nonreciprocal hybrid mode waveguide/microstrip latching phase shifter connected between a second port of said first conduction control means and a second port of said circulator, a series circuit comprising second nonreciprocal hybrid mode waveguide/microstrip latching phase shifter and a second circulator coupled for signal conducting between a third port of said conduction control means and a third port of said circulator, one of the ports of said second circulator being connected to ground.

16. A circuit as set forth in claim 15 wherein:

said second port of said first circulator succeeds the port connected to said second terminal, said conduction path control means includes a third circulator, the second port of which precedes the port connected to said first terminal, and said second circulator provide signal conduction from said third circulator to said first circulator.

17. A circuit as set forth in claim 15 further comprising:

means for changing the order of succession of said ports of said first circulator.

18. A circuit as set forth in claim 15 wherein:

said conduction path control means includes a switch for connecting its first port to its second or third ports;

said second port of said first circulator precedes said first port, and said third port of said first circulator succeeds said first port.

* * * * *